(12) United States Patent
Richard

(10) Patent No.: US 11,207,160 B2
(45) Date of Patent: *Dec. 28, 2021

(54) INTERMEDIATE ATTACHMENT PART

(71) Applicant: ANTHOGYR, Sallanches (FR)

(72) Inventor: Hervé Richard, Notre Dame de Bellecombe (FR)

(73) Assignee: ANTHOGYR, Sallanches (FR)

( * ) Notice: Subject to any disclaimer, the term of this patent is extended or adjusted under 35 U.S.C. 154(b) by 287 days.

This patent is subject to a terminal disclaimer.

(21) Appl. No.: 16/476,580

(22) PCT Filed: Jan. 23, 2018

(86) PCT No.: PCT/IB2018/050401
§ 371 (c)(1),
(2) Date: Jul. 9, 2019

(87) PCT Pub. No.: WO2018/138633
PCT Pub. Date: Aug. 2, 2018

(65) Prior Publication Data
US 2019/0365510 A1    Dec. 5, 2019

(30) Foreign Application Priority Data

Jan. 26, 2017   (FR) ..................... 17 50658

(51) Int. Cl.
*A61C 8/00* (2006.01)

(52) U.S. Cl.
CPC .......... *A61C 8/0062* (2013.01); *A61C 8/0056* (2013.01); *A61C 8/0063* (2013.01); *A61C 8/0001* (2013.01); *A61C 8/0065* (2013.01); *A61C 8/0068* (2013.01)

(58) Field of Classification Search
CPC ... A61C 8/0012; A61C 8/0062; A61C 8/0063; A61C 8/0068; A61C 8/0065; A61C 8/0048; A61C 8/0022; A61C 8/0056; A61C 13/2656
USPC .................................................. 433/172–176
See application file for complete search history.

(56) References Cited

U.S. PATENT DOCUMENTS

| 5,733,122 A * | 3/1998 | Gordon | ................... A61C 8/005 |
| | | | 433/172 |
| 5,782,918 A * | 7/1998 | Klardie | ................ A61C 8/0066 |
| | | | 606/60 |
| 7,845,946 B2 * | 12/2010 | Brajnovic | ............ A61C 8/0048 |
| | | | 433/174 |

(Continued)

FOREIGN PATENT DOCUMENTS

| JP | 5-168651 A | 7/1993 |
| KR | 2013-0097820 A | 9/2013 |

(Continued)

*Primary Examiner* — Matthew M Nelson
(74) *Attorney, Agent, or Firm* — William H. Eilberg

(57) ABSTRACT

A substantially tubular intermediate attachment part with a first through-hole for attaching a screw-retained dental prosthetic component or a dental tool to a dental implant or to a dental implant analog, extending along a first longitudinal axis between a first end and a second end. Each end is provided with a set of longitudinal fins intended for snap-fitting into the dental prosthetic component or into the dental tool on the one hand and into the dental implant on the other hand.

19 Claims, 14 Drawing Sheets

(56) References Cited

U.S. PATENT DOCUMENTS

| | | | |
|---|---|---|---|
| 8,033,826 B2* | 10/2011 | Towse | A61C 8/006 |
| | | | 433/172 |
| 8,167,619 B2* | 5/2012 | Vachtenberg | A61C 8/0089 |
| | | | 433/173 |
| 9,265,591 B1* | 2/2016 | Gittleman | A61C 8/0001 |
| 9,697,748 B1* | 7/2017 | Niznick | A61C 8/0089 |
| 2006/0014120 A1* | 1/2006 | Sapian | A61C 8/0065 |
| | | | 433/173 |
| 2008/0241790 A1* | 10/2008 | Gittleman | A61C 8/0065 |
| | | | 433/174 |
| 2008/0261174 A1* | 10/2008 | Gittleman | A61C 8/0048 |
| | | | 433/172 |
| 2009/0298013 A1* | 12/2009 | Baruc | A61C 8/0065 |
| | | | 433/174 |
| 2011/0123949 A1* | 5/2011 | Wolf | A61C 8/005 |
| | | | 433/173 |
| 2012/0251979 A1 | 10/2012 | Karim | |
| 2013/0108987 A1 | 5/2013 | Blumenthal | |
| 2014/0178836 A1* | 6/2014 | Haus | A61K 6/802 |
| | | | 433/173 |
| 2015/0140508 A1* | 5/2015 | Nike | A61C 8/005 |
| | | | 433/172 |
| 2016/0151126 A1* | 6/2016 | Nike | A61C 8/0012 |
| | | | 433/173 |
| 2016/0193020 A1 | 7/2016 | Fix | |
| 2017/0224447 A1* | 8/2017 | Richard | A61C 13/09 |
| 2018/0206945 A1* | 7/2018 | Haus | A61C 8/0062 |
| 2019/0365510 A1* | 12/2019 | Richard | A61C 8/0048 |
| 2021/0128278 A1* | 5/2021 | Richard | A61C 8/0062 |

FOREIGN PATENT DOCUMENTS

| | | | | |
|---|---|---|---|---|
| WO | WO-2011036268 A3 * | 7/2011 | | A61C 8/0063 |
| WO | 2013125924 A1 | 8/2013 | | |

* cited by examiner

INTERMEDIATE ATTACHMENT PART

TECHNICAL FIELD OF THE INVENTION

The present invention relates to the field of dental prosthetic restoration and relates more specifically to an intermediate attachment part for attaching a screw-through dental prosthetic component or dental tool to a dental implant or to a dental implant analogue.

The dental prosthetic components that need to be manipulated during dental prosthetic restoration are very small in size leading to high risks of loss or of swallowing by the patient.

The idea of securing the dental prosthetic component or components to a dental implant at least precariously, for example using the intermediate attachment part described in document U.S. Pat. No. 8,033,826 B2 has been conceived of in order to reduce these risks.

This intermediate attachment part, which is substantially tubular with a first through-passage, extends along a first longitudinal axis between a first end and a second end. The first end comprises a first set of longitudinal fins, each of these longitudinal fins comprising a radially free distal part which can move radially in an elastic manner with respect to the first longitudinal axis in order to snap-fit into the dental prosthetic component. The second end comprises a second set of longitudinal fins, each of these longitudinal fins having a radially free distal portion and being radially movable in an elastic manner with respect to the first longitudinal axis in order to snap-fit into the dental implant.

This intermediate attachment part affords precarious attachment through the snap-fitting-together of the dental implant and the dental component, for the time that it takes for the practitioner to fit an attachment screw intended to better immobilize the dental component on the dental implant.

Because this relies on snap fitting, it is necessary for the fins to have, in the axial direction of elongation of the intermediate attachment part, enough length to allow them to flex so that their free ends (or distal portions) can move radially relative to one another. If the fins are too short in length, the radial movement of the free ends of the fins with respect to one another will require too much axial force making snap-fitting uncomfortable, if to not say impossible. As a result, in order to work correctly, this intermediate attachment part has to have a significant axial dimension.

Such an axial size is a constraint that limits the structural designs of the dental implant and of the dental prosthetic component.

Document US 2016/0151126 A1 describes an intermediate attachment part similar to that of document U.S. Pat. No. 8,033,826 B2.

Document JP H05-168651 A itself describes an intermediate attachment part taking the form of a clamping jaw.

SUMMARY OF THE INVENTION

One problem proposed by the present invention is to procure an intermediate attachment part which at once facilities manipulations on the part of the practitioners (prosthetist and dental surgeon) during a dental prosthetic restoration, facilitates manipulation of the dental implant, and limits the risk of dental prosthetic components or dental tools becoming lost or swallowed.

At the same time, the present invention seeks to reduce the constraints on the structural designs of the dental implant and of the dental prosthetic component.

In order to achieve these objectives as well as others, the invention proposes a substantially tubular intermediate attachment part with a first through-passage for attaching a screw-through dental prosthesis component or a dental tool to a dental implant or to a dental implant analogue, said intermediate attachment part extending along a first longitudinal axis between a first end and a second end, and in which:

the first end comprises a first set of longitudinal fins, each longitudinal fin comprising a free distal portion that can move radially in an elastic manner in order to engage by snap-fitting in the dental prosthetic component or in the dental tool, the second end comprises a second set of longitudinal fins, each longitudinal fin comprising a free distal portion that can move radially in an elastic manner in order to engage by snap-fitting in the dental implant;

according to the invention, the first and second sets of longitudinal fins are defined by a plurality of longitudinal slots extending over just a portion of the length of the intermediate attachment part and originating alternately from the first end and from the second end, said slots extending along the one same intermediate axial segment of the intermediate attachment part such that the longitudinal fins of the first and second sets exhibit an overlap along their length.

The slots defining the first and second sets of longitudinal fins, all extending along the one same intermediate axial segment of the intermediate attachment part, provide an effective way of limiting the axial size of the attachment part while at the same time affording easy snap-fitting. Specifically, the longitudinal fins of the first and second sets overlap along their length. This overlap allows the longitudinal fins to be long enough in length for ease of snap-fitting, while at the same time giving the intermediate attachment part a reduced axial size. This reduced axial size makes manipulations on the part of the practitioners easier and reduces the constraints on the structural designs of the dental implant and of the dental prosthetic component.

According to another aspect, the present invention proposes an assembly comprising:

an intermediate attachment part as described hereinabove, a dental implant extending along a second longitudinal axis between a proximal end and a distal end, with an interior connection housing extending from the distal end and toward the proximal end and comprising an internally threaded proximal segment.

an attachment screw comprising a screw head from which there extends a screw shank equipped with a threaded segment intended to be received by screw-fitting in the internally threaded proximal segment of the dental implant. and in which the internal connection housing comprises a first groove, formed between the internally threaded proximal segment and the distal end of the dental implant, and intended to accept by snap-fitting the free distal portions of the fins of the second set of longitudinal fins.

In a first embodiment, it may be planned that the snap-fitting of the free distal portions of the fins of the second set of longitudinal fins is irreversible. The risk of unwanted separation of the intermediate attachment part and of the dental implant are thus reduced.

In a second embodiment, it may be planned that the snap-fitting of the free distal portions of the fins of the second set of longitudinal fins is reversible. The intermediate attachment part can then be extracted from the dental implant if need be.

Advantageously, the internally threaded proximal segment of the dental implant may consist of an internally threaded insert which is attached into and indexed in terms of rotation in the interior connection housing. The dental implant may thus comprise an internal connection housing of a shape that is very simple and quick to machine, thereby limiting the costs of manufacturing the dental implant. Furthermore, that limits the risk of an internal screw thread that brings with it the risks of initiating cracks in the dental implant. This proves to be particularly beneficial in the case of a dental implant made of ceramic, the hardness of which makes machining difficult and which is sensitive to the risks of crack initiators.

Advantageously, the second end of the intermediate attachment part and the internally threaded insert may be shaped in such a way that, when the internally threaded insert is axially in abutment against the second end of the intermediate attachment part, this abutment opposes withdrawal of the second end of the intermediate attachment part from the first groove. The intermediate attachment part and the dental implant are thus rendered inseparable in a simple way using the fixing screw.

For preference, a relative translational movement of the internally threaded insert toward the distal end of the dental implant along the second longitudinal axis may cause radial expansion of the second end of the intermediate attachment part. In this way it becomes possible to improve the retention of the intermediate attachment part in the dental implant beyond the retention afforded by the snap-fitting in instances in which this snap fitting has the free distal parts of the longitudinal fins of the second set of longitudinal fins penetrating the first groove only partially.

Advantageously, it may be planned that:

the assembly comprises a dental prosthetic component comprising a second through-passage made up of successive first and second passage segments, said first passage segment extending from a proximal end of the dental prosthetic component along a third longitudinal axis, and said second passage segment prolonging the first passage segment, the first passage segment comprises a second groove intended to receive by snap-fitting the free distal parts of the fins of the first set of longitudinal fins.

Because the axial size of the intermediate attachment part is small, the length of the first passage segment may be reduced and may thus leave the designer of the dental prosthetic component greater freedom in the structural definition of the second passage portion, notably in terms of the orientation thereof.

Advantageously, it may be planned that the first end of the intermediate attachment part and the head of the attachment screw are shaped in such a way that, when the head of the attachment screw is axially in abutment against the first end of the intermediate attachment part, this abutment opposes withdrawal of the first end of the intermediate attachment part from the second groove.

There is thus no need to provide a screw seat in the dental prosthetic component, such seating being afforded by the first end of the intermediate attachment part. This then reduces still further the length needed for the first passage segment.

For preference, it may be planned that a relative translational movement of the head of the attachment screw toward the proximal end of the dental implant along the second longitudinal axis causes radial expansion of the first end of the intermediate attachment part. In this way it becomes possible to increase the retention of the intermediate attachment part in the dental prosthetic component above and beyond the retention afforded by the snap-fitting in instances in which this snap fitting has the free distal parts of the longitudinal fins of the first set of longitudinal fins penetrating the second groove only in part.

Advantageously, the second groove and/or the first end of the intermediate attachment part have respective contact surfaces which are shaped in such a way that radial expansion of the first end of the intermediate attachment part causes the proximal end of the dental prosthetic component to press axially, along the second longitudinal axis, toward the distal end of the dental implant. Such axial pressing provides an effective way of limiting the risks of the ingress and proliferation of bacteria at the interfaces between the dental prosthetic component and the dental implant (and any intermediate components there might be).

For preference, it may be planned that:

the first passage segment of the dental prosthetic component has transverse dimensions that allow it to accept the first end of the intermediate attachment part and the screw head by axial penetration along the third longitudinal axis from the proximal end of the dental prosthetic component, the second passage segment of the dental prosthetic component has transverse dimensions smaller than those of the first passage segment but large enough for the passage of a tool used to turn the attachment screw along the third longitudinal axis.

The fixing screw can thus be screwed in partially by the practitioner before he or she attaches the dental prosthetic component to the dental implant by snap-fitting and the fixing screw can then be screwed in more completely in order to better immobilize the dental prosthetic component on the dental implant. The risk of the fixing screw becoming lost or swallowed by the patient is thus effectively reduced.

At the same time, the fixing screw is not inserted through the dental prosthetic component by passing in succession through the second passage segment and then the first passage segment. The transverse dimensions of the second passage segment may thus be reduced since only the passage for the screw-driving tool remains necessary, and this tool may have a transverse dimension that is very much smaller than that of the head of the fixing screw. This limits the amount of material removed from the dental prosthetic component in order to create the second passage segment. The risks of weakening the mechanical strength of the dental prosthetic component are thus reduced.

Advantageously, the first and second passage segments may form a non-zero angle between them.

The angular nature of the second through-passage allows the coronal emergence of the access well to be positioned away from the active parts of the dental prosthetic component during mastication (cuspids), notably when the dental prosthetic component is:

a dental prosthesis abutment having an exterior shape substantially in the shape of a tooth, made of metal or of ceramic, or a ceramic block of substantially cylindrical or prismatic external shape which is intended to be machined in order to obtain a substantially tooth-shaped external shape.

For preference, the dental prosthetic component may comprise a proximal end configured to come directly into abutment against the distal end of the dental implant. This then limits the number of components. In the case of a dental prosthetic component made of ceramic, recourse may advantageously be had to a dental implant likewise made of ceramic, in order to obtain ceramic-to-ceramic contact thereby avoiding the phenomena of premature wearing of the dental implant.

Advantageously, the assembly may comprise means for indexing the rotation of the dental prosthetic component and of the dental implant about the second longitudinal axis.

The intermediate attachment part of the present invention may make it possible to attach and fix to a dental implant, sometimes only precariously:

a dental prosthetic component of the dental post type, or a dental prosthesis abutment having an exterior shape substantially in the shape of a tooth, made of metal or made of ceramic, or a block of ceramic of substantially cylindrical or prismatic exterior shape and intended to be machined in order to obtain a substantially tooth-shaped exterior shape, or a dental tool of the impression-transfer, implant-bearing, intra-oral scanning body healing cap or closure cap type, said dental tool extending along a fourth longitudinal axis and comprising an interior bore equipped with a third groove intended to accept, by snap-fitting, the free distal parts of the fins of the first set of longitudinal fins.

According to another aspect, the present invention proposes an assembly comprising:

an intermediate attachment part as described hereinabove, a dental implant analogue extending along a fifth longitudinal axis between a proximal end and a distal end, with an internal connection housing extending from the distal end and in the direction of the proximal end, which internal connection housing comprises a fourth groove intended to accept by snap-fitting the free distal portions of the fins of the second set of longitudinal fins.

For preference, means for indexing the rotation of the dental tool or of the dental implant analogue about the fourth or the fifth longitudinal axis are planned.

BRIEF DESCRIPTION OF THE DRAWINGS

Further objects, features and advantages of the present invention will become apparent from the following description of some particular embodiments, which description is given in connection with the attached figures, among which.

DESCRIPTION OF THE PREFERRED EMBODIMENTS

Figure 1:
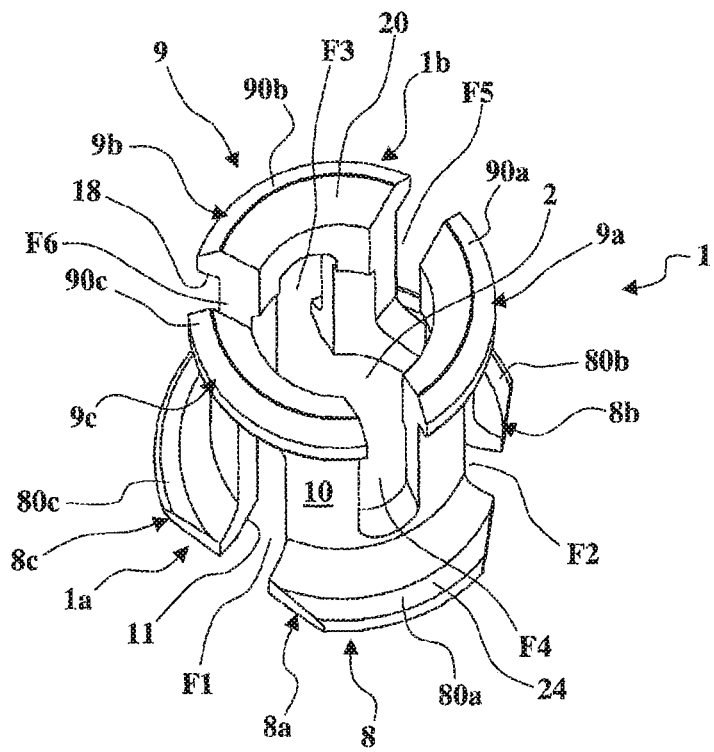
FIG. 1 is a perspective view of a first particular embodiment of an intermediate attachment part according to the invention.
Figure 2:
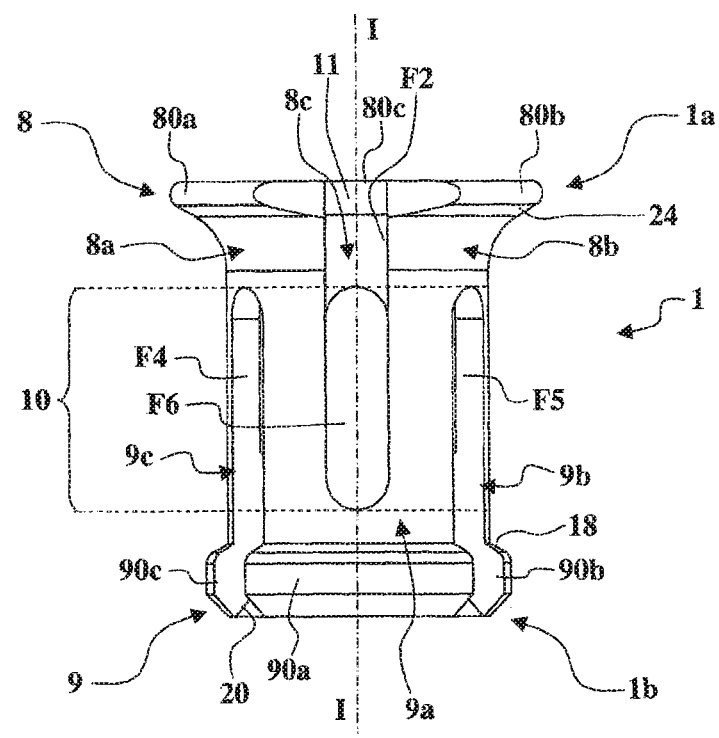
FIG. 2 is a side view of the intermediate attachment part of FIG. 1.

FIGS. 1 and 2 illustrate a first particular embodiment of an intermediate attachment part 1 according to the invention.

This intermediate attachment part 1 is substantially tubular with a first through-passage 2 allowing the passage of a threaded element such as a fixing screw 3 (FIG. 3) for attaching a screw-through dental prosthetic component 4 (FIGS. 7 and 9) or a dental tool 5 (FIGS. 11, 13, 15, 17 and 18) to a dental implant 6 or to a dental implant analogue 7.

The intermediate attachment part 1 extends along a first longitudinal axis I-I between a first end 1*a* and a second end 1*b*.

The first end 1*a* comprises a first set 8 of longitudinal fins 8*a* to 8*c*, each longitudinal fin 8*a* to 8*c* comprising a free distal portion 80*a* to 80*c* that is radially movable in an elastic manner with respect to the first longitudinal axis I-I to engage in the dental prosthetic component 4 or in the dental tool 5 by snap fitting.

The second end 1*b* comprises a second set 9 of longitudinal fins 9*a* to 9*c*, each longitudinal fin 9*a* to 9*c* comprising a free distal portion 90*a* to 90*c* that can move radially in an elastic manner with respect to the first longitudinal axis I-I to engage in the dental implant 6 by snap fitting.

The first 8 and second 9 sets of longitudinal fins 8*a*-8*c* and 9*a*-9*c* are defined by a plurality of longitudinal slots F1 to F6 each extending over just part of the length of the intermediate attachment part 1 and beginning alternately from the first end 1*a* (in the case of the slots F1 to F3) and from the second end 1*b* (in the case of the slots F4 to F6). The slots F1 to F6 all extend over the one same intermediate axial segment 10 of the intermediate attachment part 1. In this way, the longitudinal fins 8*a*-8*c* of the first set 8, defined by the slots F1 to F3, overlap along their length (on the intermediate axial segment 10) with the longitudinal fins 9*a*-9*c* of the second set 9, defined by the slots F4 to F6.

Figure 3:
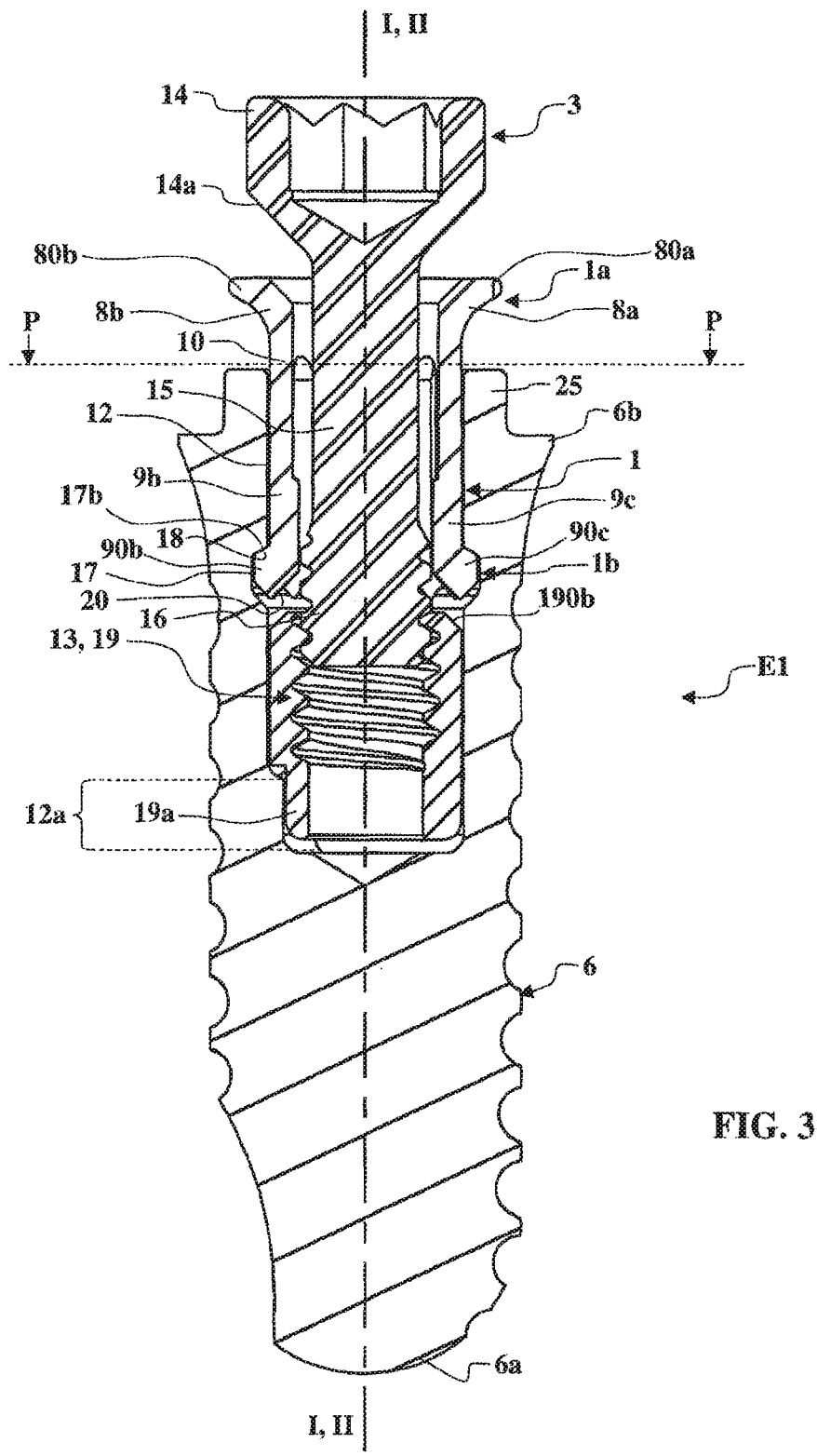
FIG. 3 is a view in longitudinal section of one particular embodiment of a first assembly according to the invention, comprising a dental implant and the intermediate attachment part of FIG. 1.

FIG. 3 illustrates one particular embodiment of the first assembly E1 according to the invention, comprising a dental implant 6 and the intermediate attachment part 1 of FIGS. 1 and 2.

The dental implant 6 extends along a second longitudinal axis II-II between a proximal end 6a and a distal end 6b. It comprises an internal connection housing 12 extending from the distal end 6b and in the direction of the proximal end 6a, and comprising an internally threaded proximal segment 13.

The first assembly E1 also comprises a fixing screw 3 comprising a screw head 14 from which there extends a screw shank 15 provided with a threaded segment 16 intended to be accepted by screw-fastening in the internally threaded proximal segment 13 of the dental implant 6.

The internal connection housing 12 comprises a first groove 17, formed between the internally threaded proximal segment 13 and the distal end 6b of the dental implant 6, and intended to accept by snap-fitting the free distal portions 90a to 90c of the longitudinal fins 9a to 9c.

The snap-fitting of the free distal portions 90a to 90c of the longitudinal fins 9a to 9c is reversible. In order to achieve that, use is made of a frustoconical distal segment 17b of a first groove 17 which segment is shaped in such a way as to cause the free distal portions 90a to 90c of the longitudinal fins 9a to 9c to move (closer together) toward the first longitudinal axis I-I when a pulling force is applied to the intermediate attachment part 1 along the first longitudinal axis I-I away from the proximal end 6a of the dental implant 6.

It will be noted that the free distal portions 90a to 90c of the longitudinal fins 9a to 9c comprise a substantially frustoconical contact surface 18. This substantially frustoconical contact surface 18 substantially complements the frustoconical distal segment 17b of the first groove 17, in order to ensure surface contact that provides even distribution of load between the intermediate attachment part 1 and the dental implant 6 when an axial load is applied along the first longitudinal axis I-I that has a tendency to extract the intermediate attachment part 1 from the dental implant 6.

It may be seen more particularly in FIG. 3 that the internally threaded proximal segment 13 of the dental implant 6 is made up of an internally threaded insert 19, added to and indexed in terms of rotation in the internal connection housing 12.

Figure 4:
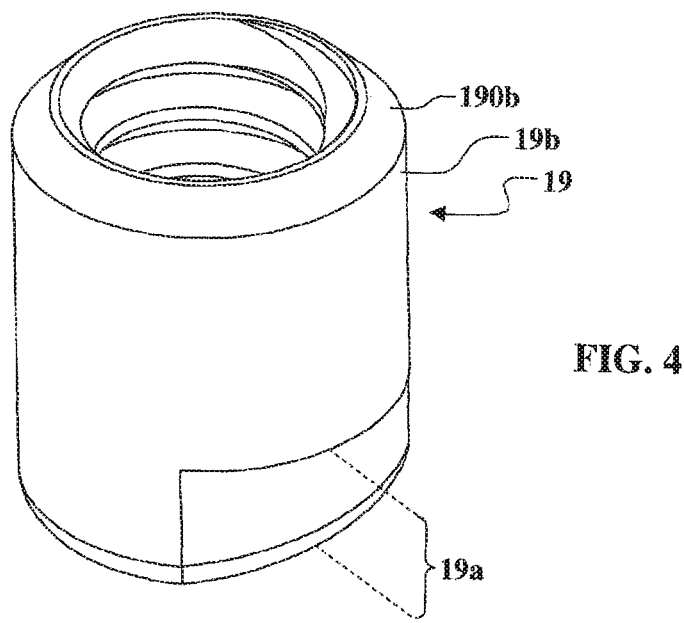
FIG. 4 is a perspective view of an internally threaded insert used in the context of the first assembly of FIG. 3.
Figure 5:
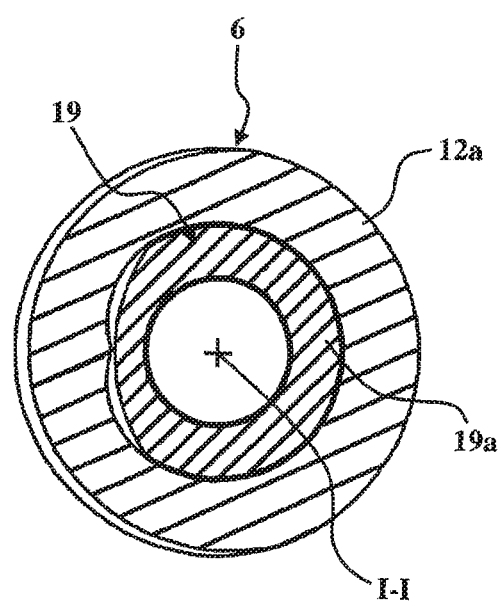
FIG. 5 is a view in cross section of the first assembly of FIG. 3.

The internally threaded insert 19 is better depicted in FIG. 4. It comprises a proximal segment 19a with a cross section of noncircular shape and which is intended to enter an end segment 12a of the internal connection housing 12. The end segment 12a likewise has a shape of non-circular cross section inside which the non-circular cross-sectional shape of the proximal segment 19a is inscribed, as is more particularly visible in FIG. 5. The end segment 12a and the proximal segment 19a collaborate, on account of their non-circular cross-sectional shapes, to index the internally threaded insert 19 in terms of rotation inside the internal connection housing 12 about the first longitudinal axis I-I. This collaboration allows the fixing screw 3 to be screwed into (out of) the internally threaded insert 19.

The internally threaded insert 19 is held captive in the internal connection housing 12 when the intermediate attachment part 1 is snap-fitted into the dental implant 6.

It will be noted in FIG. 4 that the internally threaded insert 19 comprises a distal segment 19b that has a frustoconical lateral surface 190b. On the side of the intermediate attachment part 1, the free distal portions 90a to 90c of the longitudinal fins 9a to 9c comprise a seat 20 that is substantially frustoconical and substantially complementary designed to have the distal segment 19a bearing against it (this being substantially its complement in order to afford a large bearing surface area).

When the internally threaded insert 19 is bearing axially against the second end 1b of the intermediate attachment part 1 (FIG. 7), this bearing contact opposes withdrawal of the second end 1b of the intermediate attachment part 1 from the first groove 17: the free distal portions 90a to 90c of the longitudinal fins 9a to 9c are effectively no longer able to move toward the first longitudinal axis I-I in order to escape from the first groove 17.

In instances in which, after the free distal portions 90a to 90c have been snap-fitted into the first groove 17, the radial extensions of the free distal portions 90a to 90c penetrate the first groove 17 only partially (so as to afford easier snap-fitting and separation of the intermediate attachment part 1 and of the dental implant 6), then plans can be made for a relative translational movement of the internally threaded insert 19 toward the distal end 6b of the dental implant 6 along the second longitudinal axis II-II to bring about radial expansion of the second end 1b of the intermediate attachment part 1. That increases the penetration of the radial extensions of the free distal portions 90a to 90c in the first groove 17 and thus improves the retention of the intermediate attachment part 1 in the dental implant 6.

Figure 6:
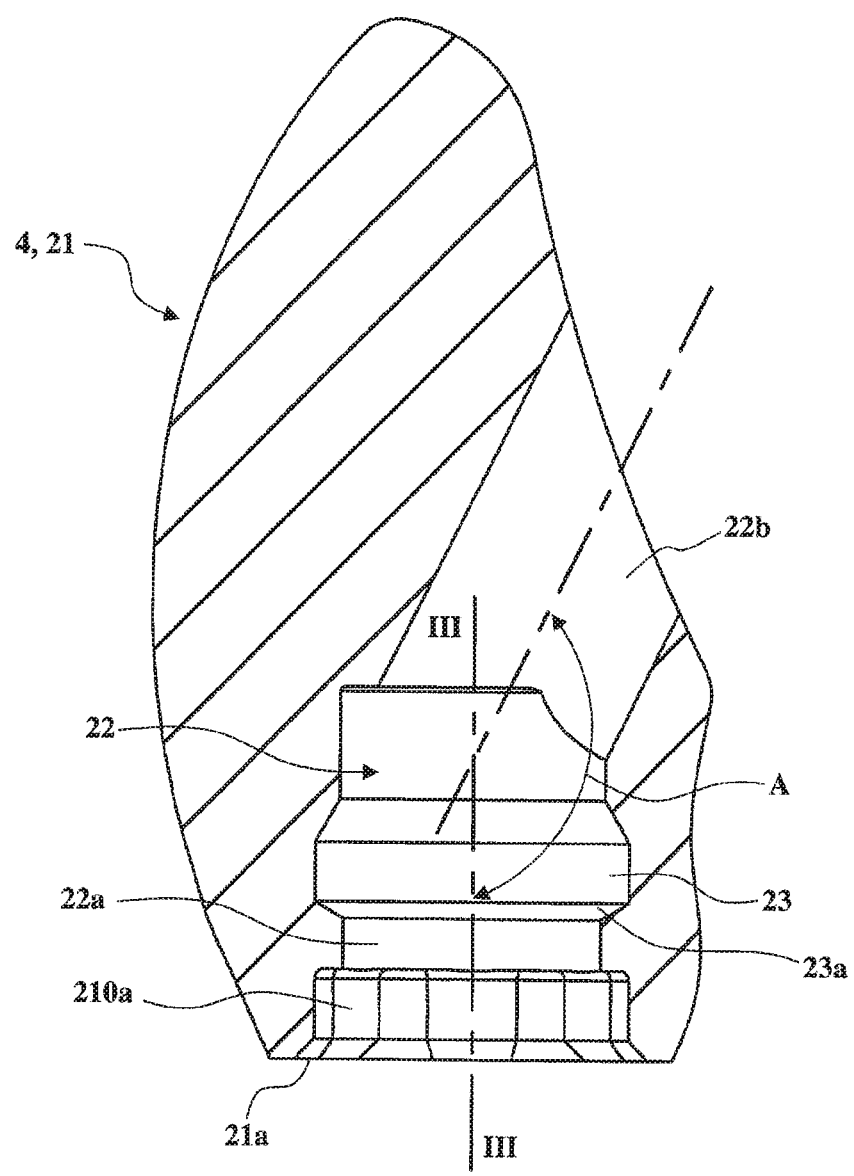
FIG. 6 is a view in longitudinal section of a dental prosthetic component of the dental prosthetic abutment type having an exterior shape substantially in the shape of a tooth, made of metal or of ceramic.

FIG. 6 illustrates a dental prosthetic component 4 of the dental prosthesis abutment type 21 having an exterior shape substantially in the shape of 10o a tooth. This dental prosthesis abutment 21 is made of metal or of ceramic. When it is made of ceramic, it is obtained by machining a block of ceramic or produced by the sintering of a ceramic powder, and may possibly be coated by the prosthetist with one or more very lightweight texturing or coloration layers to give an appearance as close as possible to that of a natural tooth.

The dental prosthesis abutment 21 comprises a second through-passage 22 made up of first 22a and second 22b successive passage segments, said first passage segment 22a extending from a proximal end 21a of the dental prosthesis abutment 21 along a third longitudinal axis III-III, and said second passage segment 22b prolonging the first passage segment 22a.

The first passage segment 22a comprises a second groove 23 intended to receive by snap-fitting the free distal portions 80a to 80c of the longitudinal fins 8a to 8c of the first set 8.

Figure 7:
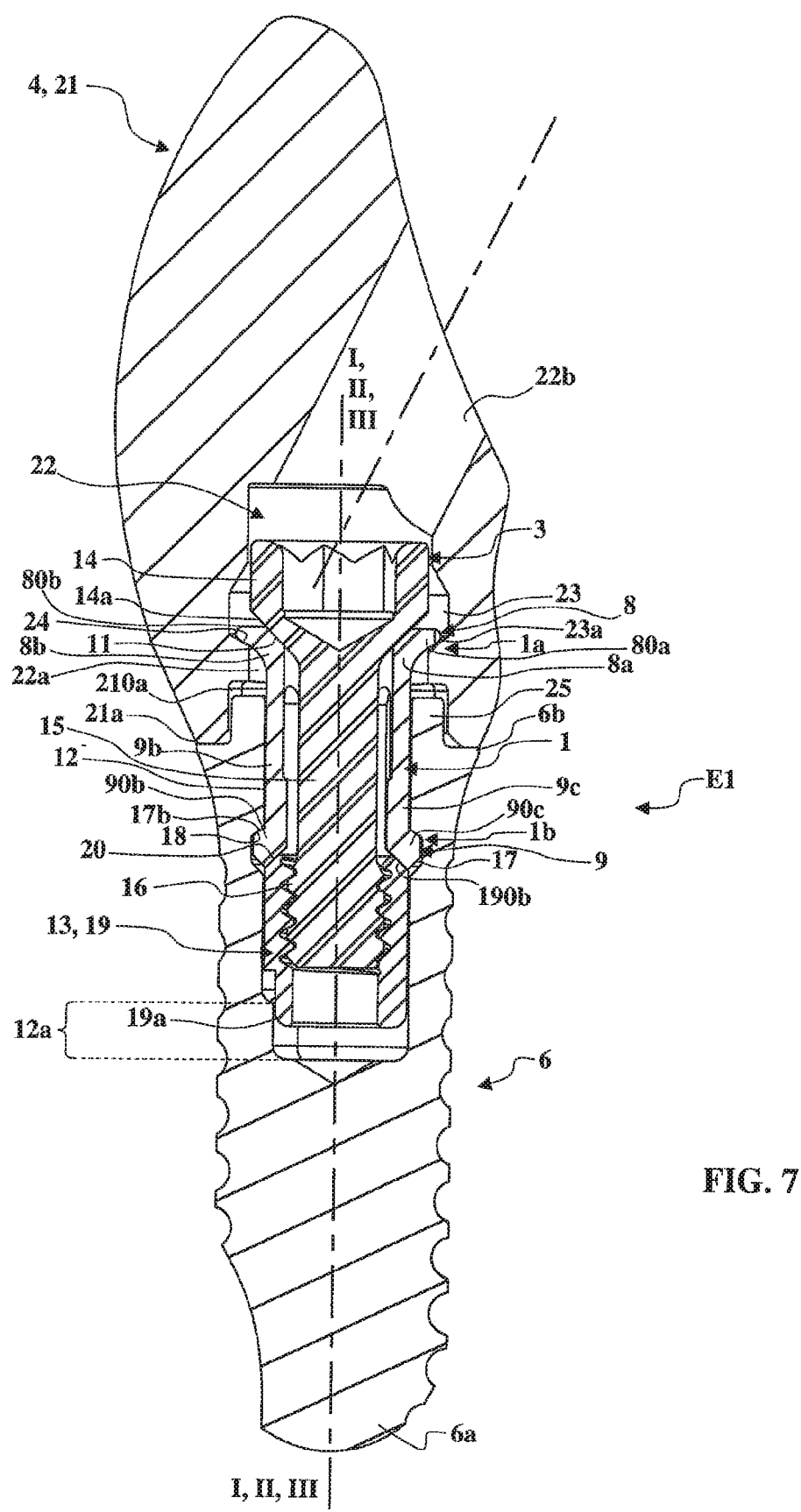
FIG. 7 is a view in longitudinal section of one particular embodiment of a first assembly according to the invention with the dental prosthetic component of FIG. 6.

It may be seen more particularly in FIG. 7 that the first end 1a of the intermediate attachment part 1 and the head 14 of the fixing screw 3 are shaped in such a way that, when the head 14 of the fixing screw 3 is bearing axially against the first end 1a of the intermediate attachment part 1, this bearing opposes withdrawal of the first end 1a of the intermediate attachment part 1 from the second groove 23.

More specifically, the intermediate attachment part 1 comprises, at its first end 1a, a substantially frustoconical seat 11 against which the frustoconical surface 14a provided under the screw head 14 comes to bear. The frustoconical surface 14a and the frustoconical seat 11 substantially complement one another in order to afford surface contact to allow load spreading.

Once again, in instances in which, after the snap-fitting of the free distal portions 80a to 80c in the second groove 23, the radial extensions of the free distal portions 80a to 80c penetrate the second groove 23 only partially (in order to afford easier snap-fitting and separation of the intermediate attachment part 1 and of the dental prosthesis abutment 21), plans may be made for a relative translational movement of the head 14 of the fixing screw 3 toward the proximal end 6a of the dental implant 6 along the second longitudinal axis II-II to bring about radial expansion of the first end 1a of the intermediate attachment part 1. This increases the penetration of the radial extensions of the free distal portions 80a to 80c in the second groove 23 and thus improves the retention of the intermediate attachment part 1 in the dental prosthesis abutment 21.

It may be seen more particularly in FIG. 2 that the first end 1a of the intermediate attachment part 1 comprises a substantially frustoconical contact surface 24. For its part, the second groove 23 comprises a proximal segment 23a which is frustoconical (substantially complementing the contact surface 24). When the first end 1a of the intermediate attachment part 1 experiences radial expansion, this radial expansion causes the proximal end 21a of the dental prosthetic component 4 (the dental prosthesis abutment 21) to press axially along the second longitudinal axis II-II toward the distal end 6b of the dental implant 6.

The dental prosthesis abutment 21 furthermore comprises a proximal end 21a shaped to come to bear directly against the distal end 6b of the dental implant 6. The axial pressing therefore makes it possible to achieve a seal between the dental prosthesis abutment 21 and the dental implant 6.

It will be noted from FIG. 7 that the first passage segment 22a of the dental prosthesis abutment 21 has transverse dimensions that allow it to accommodate the first end 1a of the intermediate attachment part 1 and the screw head 14 by axial penetration along the third longitudinal axis III-III from the proximal end 21a of the dental prosthesis abutment 21. The second passage segment 22b of the dental prosthesis abutment 21 itself has transverse dimensions smaller than those of the first passage segment 22a, but large enough for the passage of a tool that can be used to turn the fixing screw 3 along the second longitudinal axis II-II.

FIG. 6 more particularly shows that the first 22a and second 22b passage segments form a non-zero angle A between them.

Indexing means make it possible to index the dental prosthesis abutment 21 and the dental implant 6 in terms of rotation about the second longitudinal axis II-II. In this particular instance, the indexing means comprise a proximal housing 210a with a non-circular (in this instance hexagonal) cross section which with a small amount of clearance accepts a hexagonal distal prolongation 25 of the dental implant 6.

As an alternative to a dental prosthesis abutment 21 having an external shape substantially in the shape of a tooth, the dental prosthesis abutment 21 may be a block of ceramic of substantially cylindrical or prismatic external shape intended to be machined in order to obtain a substantially tooth-shaped external shape (as illustrated for example in documents KR 10-2013-0097820, US 2012/0251979 and EP 2 837 357).

Figure 8:
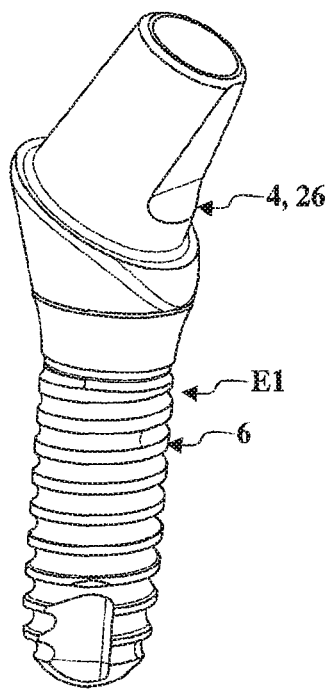
FIG. 8 is a perspective view of the first assembly of FIG. 3 with a dental prosthetic component of the dental post type.
Figure 9:
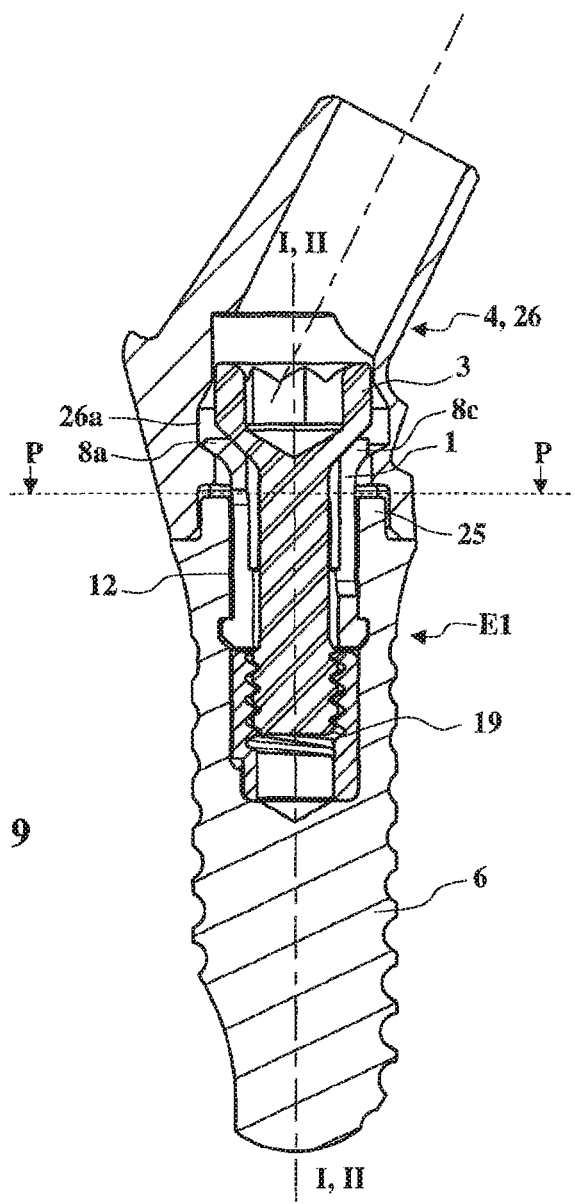
FIG. 9 is a view in longitudinal section of the first assembly of FIG. 8.

The intermediate attachment part 1 allows other types of dental prosthetic item 4 to be attached and fixed to the dental implant 6. In FIGS. 8 and 9, the dental prosthetic component 4 is a dental post 26. Its internal configuration is similar to that of the dental prosthesis abutment 21, with a groove 26a which by snap-fitting accepts the free distal portions 80a to 80c of the longitudinal fins 8a to 8c for precarious attachment. The fixing screw 3 allows the dental post 26 to be attached more firmly to the dental implant 6 in the same way as the dental prosthesis abutment 21 by bearing on the second end 1b of the intermediate attachment part 1.

The intermediate attachment part 1 also allows one of a plurality of dental tools 5 (FIGS. 10 to 18) to be attached and fixed to the dental implant 6. All these dental tools 5 extend along a fourth longitudinal axis IV-IV and have an internal bore 32 provided with a third groove 33 intended to accept by snap-fitting the free distal portions 80a-80c of the longitudinal fins 8a-8c of the first set of fins 8.

Figure 10:
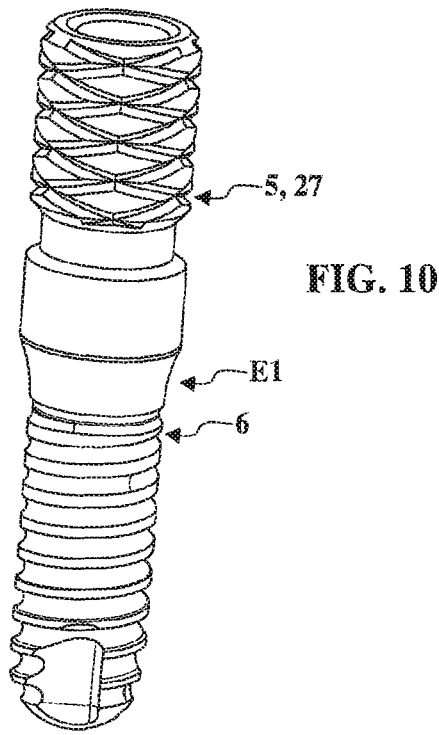
FIG. 10 is a perspective view of the first assembly of FIG. 3 with a dental tool of the implant carrier type.
Figure 11:
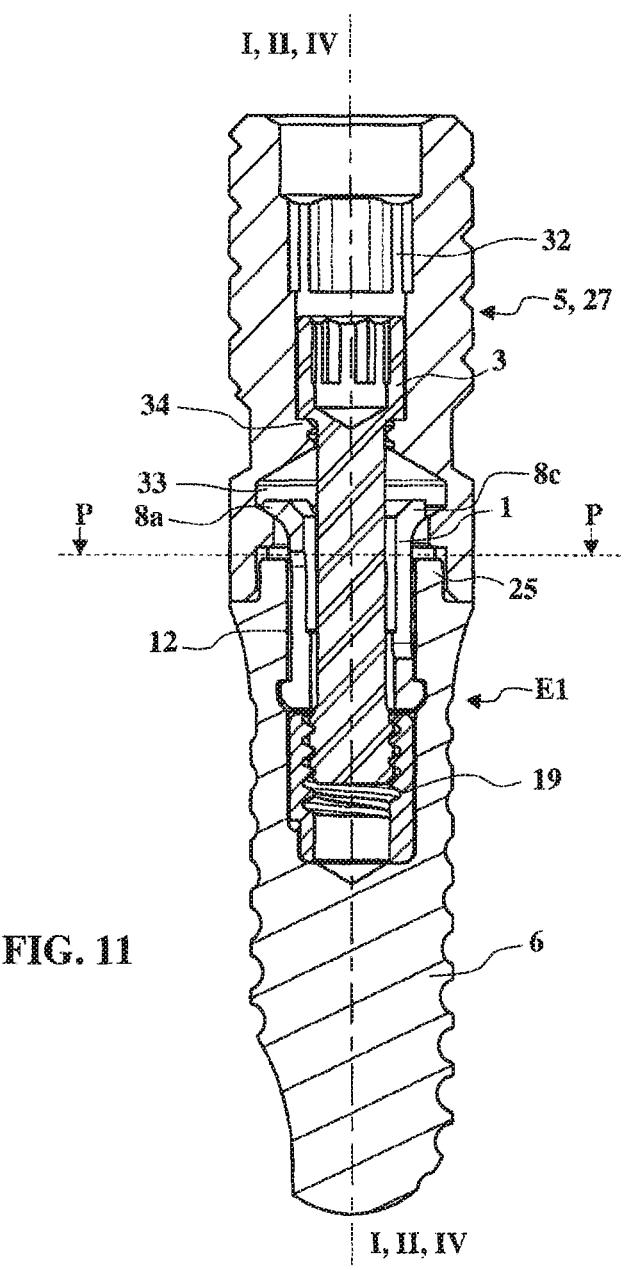
FIG. 11 is a view in longitudinal section of the first assembly of FIG. 10.

In FIGS. 10 and 11, the first assembly E1 comprises a dental tool 5 of the implant carrier type 27. The snap-fitting of the longitudinal fins 8a-8c into the third groove 33 provides only a temporary and precarious attachment. A firmer attachment of the implant carrier 27 is obtained by means of the fixing screw 3 coming to bear against a seat 34 provided in the implant carrier 27. The implant carrier 27 allows the dental implant 6 to be transported and then inserted by screwing into the bone of the patient's jaw using a dental handpiece.

Figure 12:
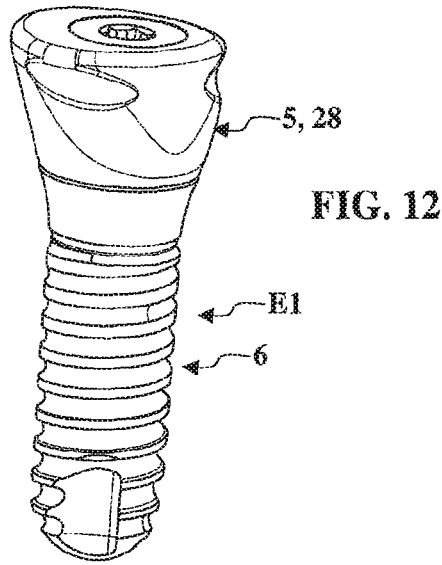
FIG. 12 is a perspective view of the first assembly of FIG. 3 with a dental tool of the healing cap type.
Figure 13:
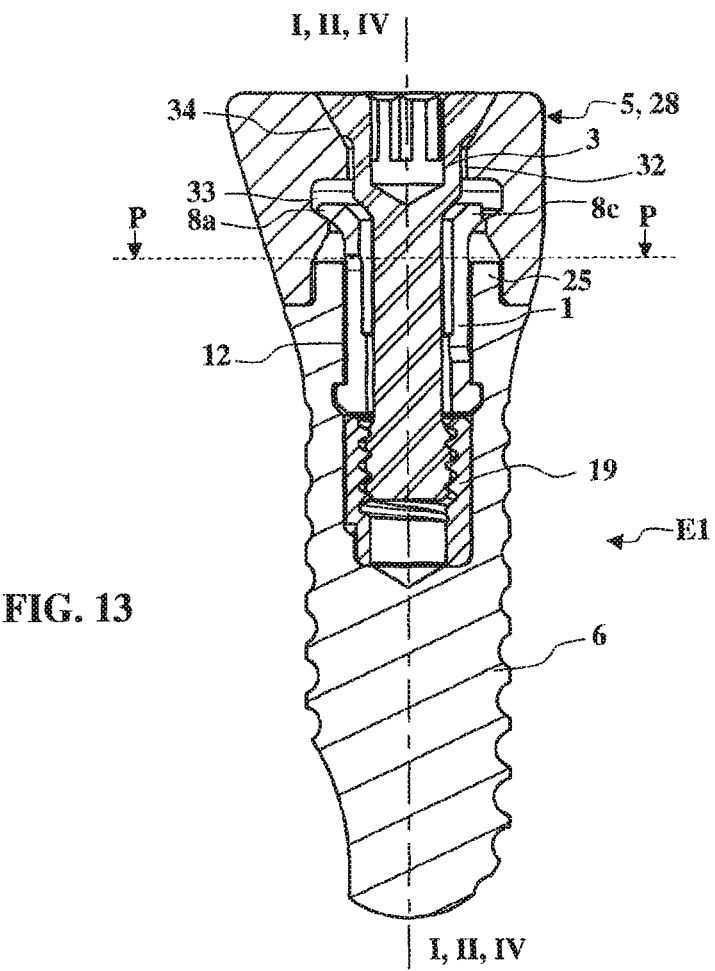
FIG. 13 is a view in longitudinal section of the first assembly of FIG. 12.

In FIGS. 12 and 13, the first assembly E1 comprises a dental tool 5 of the healing cap type 28. The snap-fitting of the longitudinal fins 8a-8c into the third groove 33 affords only a temporary and precarious attachment. Firmer attachment of the healing cap 28 is obtained by the fixing screw 3 which comes to bear sealingly against a seat 34 provided in the implant carrier 27. The healing cap 28 has an asymmetric shape that makes it possible to take account of the shape and height of the gum on the inside and on the outside of the dental arch. The healing cap 28 closes off the dental implant 6 during the period of osteointegration of the dental implant 6 (in order to prevent the ingress of contaminants into the internal connection housing 12 thereof), during which period the gum will also heal around the dental implant 6 in order to correctly cover the bone.

Figure 14:
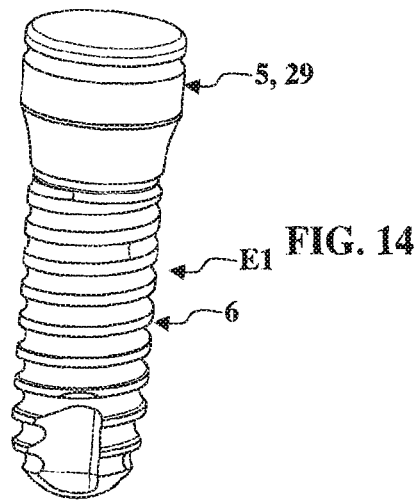
FIG. 14 is a perspective view of the first assembly of FIG. 3, with a dental tool of the cover cap type.
Figure 15:
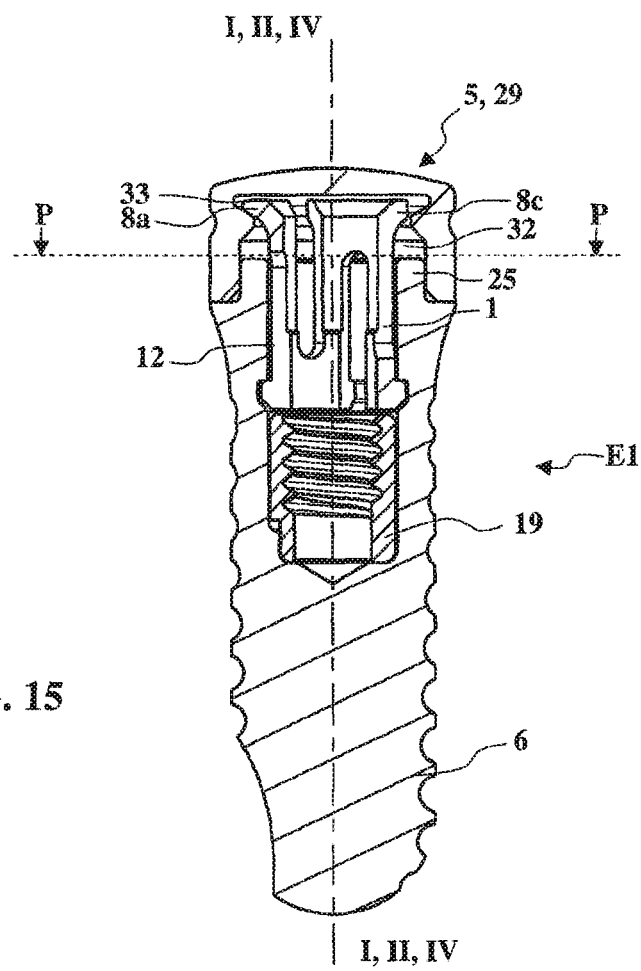
FIG. 15 is a view in longitudinal section of the first assembly of FIG. 14.

In FIGS. 14 and 15, the first assembly E1 comprises a dental tool 5 of the cover cap type 29. The snap-fitting of the longitudinal fins 8a-8c into the third groove 33 affords only temporary and precarious attachment. In this instance, no firmer attachment is planned. The cover cap 29 has a symmetrical shape and allows the dental implant 6 to be temporarily and sealingly closed over in order to prevent the ingress of contaminants into the internal connection housing 12 thereof.

Figure 16:
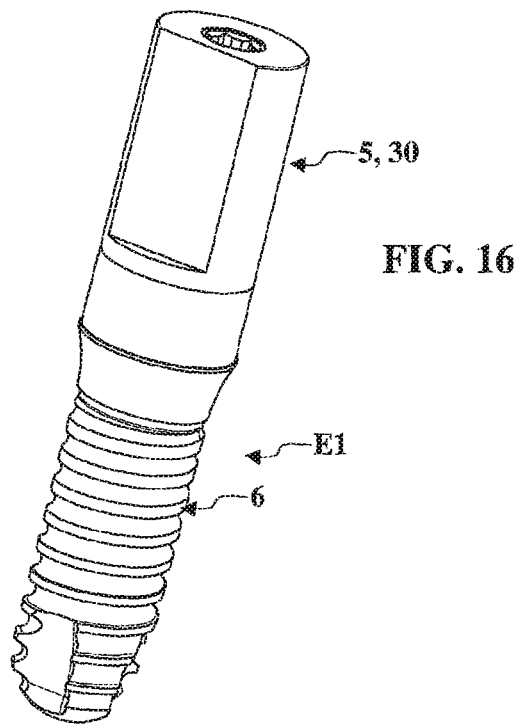
FIG. 16 is a perspective view of the first assembly of FIG. 3 with a dental tool of the intra-oral scanner type.
Figure 17:
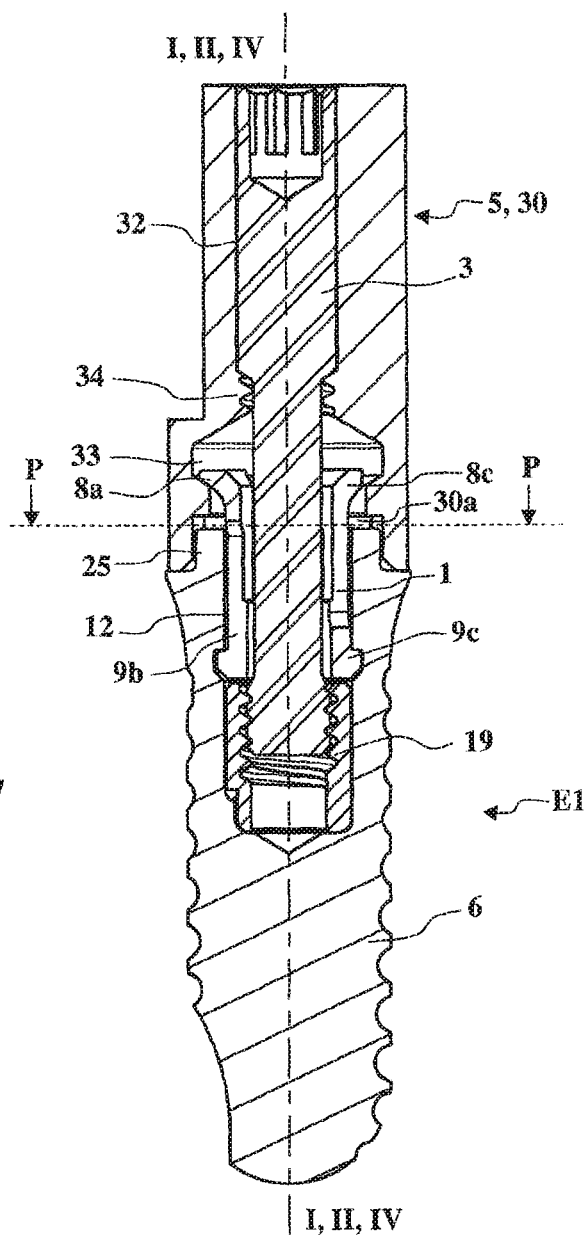
FIG. 17 is a view in longitudinal section of the first assembly of FIG. 16.

In FIGS. 16 and 17, the first assembly E1 comprises a dental tool 5 of the intra-oral scanner type 30. The snap-fitting of the longitudinal fins 8a-8c into the third groove 33 affords only temporary and precarious attachment. Firmer attachment of the intra-oral scanner 30 is obtained using the fixing screw 3 which comes to bear against a seat 34 provided in the intra-oral scanner 30. The intra-oral scanner 30 has an asymmetric shape (has at least one flat) and is indexed in terms of rotation on the dental implant 6 by a proximal housing 30a of non-circular (in this instance hexagonal) cross section collaborating with the distal prolongation 25 of the dental implant 6 which prolongation has a non-circular (in this instance likewise hexagonal) cross section. The intra-oral scanner 30 makes it possible to identify the position and orientation of the dental implant 6 in the bone of the patient's jaw in order to plan suitable dental prosthetic components which are intended to be attached and fixed to the dental implant 6.

Figure 18:
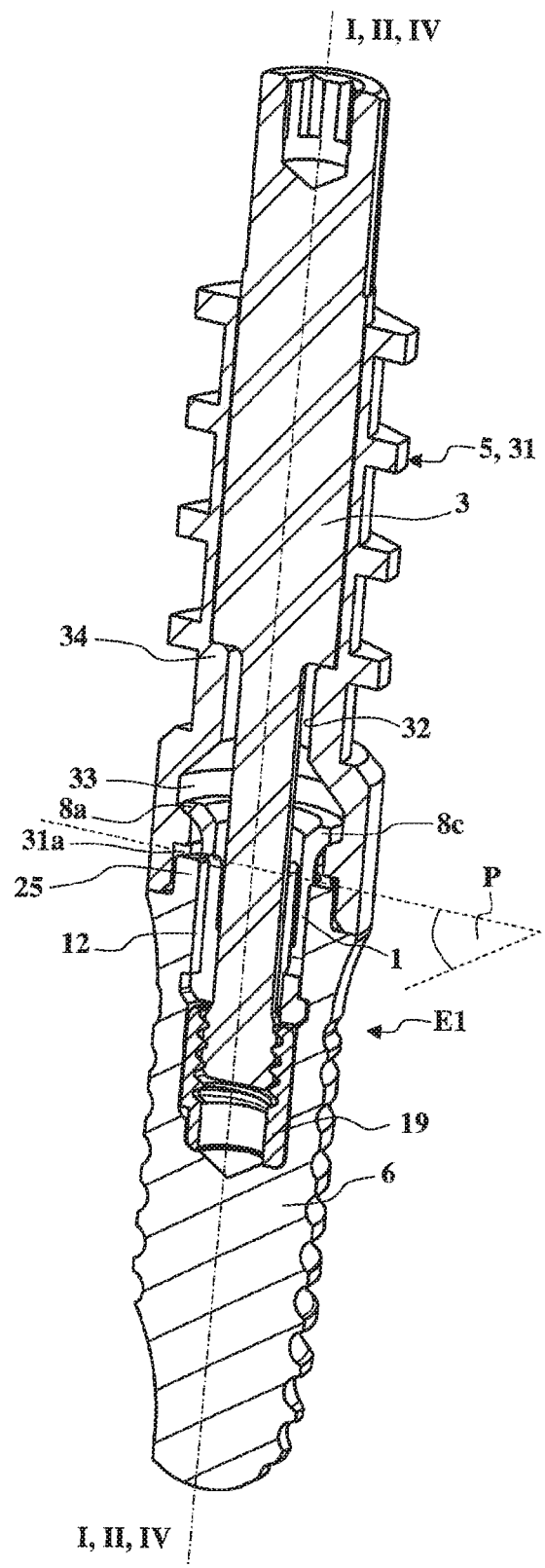
FIG. 18 is a view in perspective and in longitudinal section of the first assembly of FIG. 3 with a dental tool of the impression coping type.

In FIG. 18, the first assembly E1 comprises a dental tool 5 of the impression coping type 31 (sometimes known as "pickup copings"). The snap-fitting of the longitudinal fins 8a-8c in the third groove 33 affords only temporary and precarious attachment. Firmer attachment of the impression coping 31 is obtained using the fixing screw 3 coming to bear against a seat 34 provided in the impression coping 31. The impression coping 31 has an asymmetric shape and is indexed in terms of rotation on the dental implant 6 by a proximal housing 31a of non-circular (in this instance hexagonal) cross section collaborating with the distal prolongation 25 of non-circular (in this instance likewise hexagonal) cross section of the dental implant 6. The impression coping 31 makes it possible to identify the position and the orientation of the dental implant 6 in the bone of the patient's jaw for the purposes of subsequent manufacture of a master model (generally made of plaster) that allows the dental prosthetist to provide suitable dental prosthetic components intended to be attached and fixed to the dental implant 6.

Because of the at least precarious attachment afforded by the intermediate attachment part 1, the manipulation operations performed by the practitioners (prosthetist and dental surgeon) during dental prosthetic restoration become easier as a result of the formation of assemblies or subassemblies that facilitate transport (particularly of the dental implant 6) and that limit the risks of dental prosthetic components 4 or dental tools 5 being lost or swallowed, notably before the fixing screw has been fitted in the dental implant 6.

Figure 19:
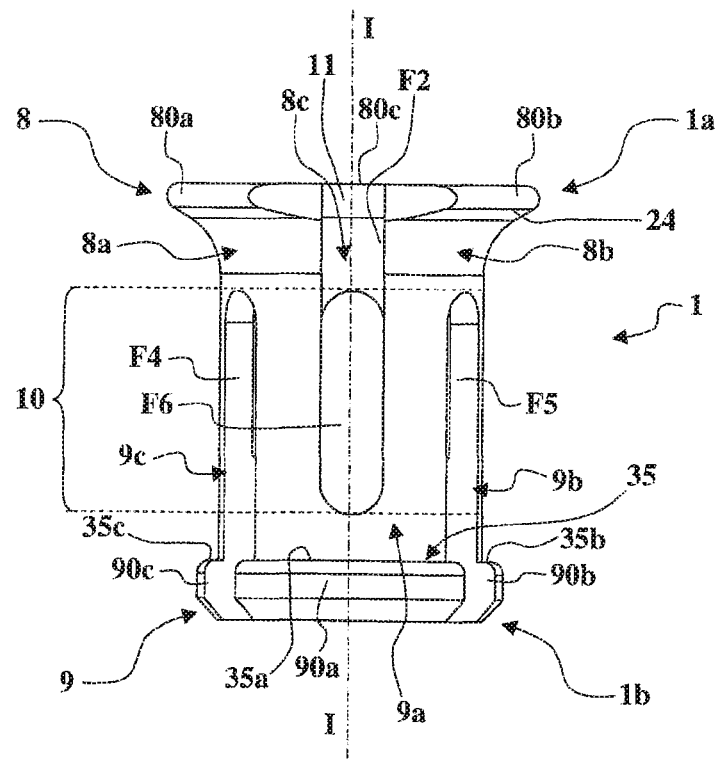
FIG. 19 is a side view of a second particular embodiment of intermediate attachment part according to the invention.

In FIGS. 8 to 18, use is made of an intermediate attachment part 1 according to a second embodiment of the invention, more particularly visible in FIG. 19. This intermediate attachment part 1 differs from that of FIGS. 1 and 2 in that the distal ends 90a to 90c have planar facets 35a to 35c substantially perpendicular to the first longitudinal axis I-I and oriented toward the first end 1a. The facets 35a to 35c form a contact surface 35 substantially in the shape of a ring.

Figure 20:
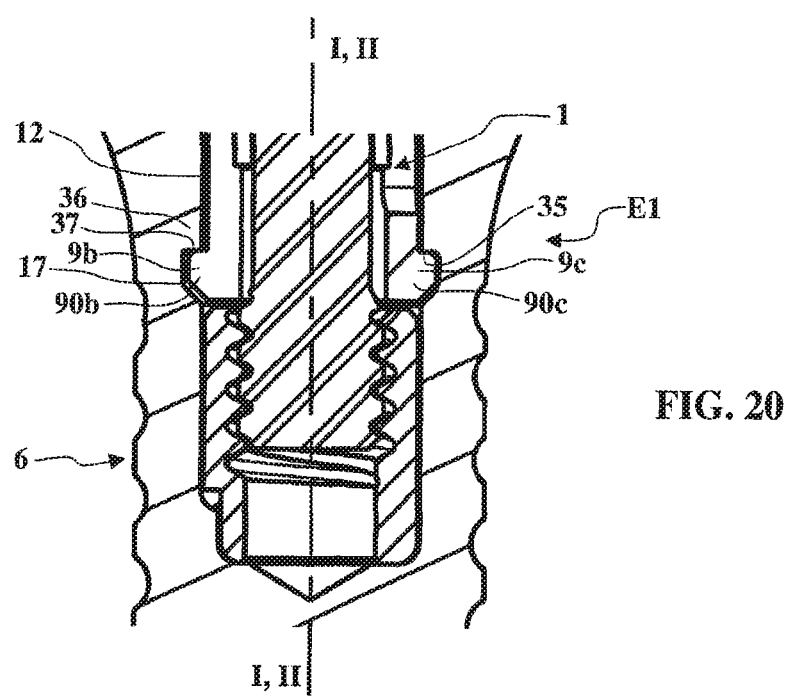
FIG. 20 is a partial view in longitudinal section of a first assembly according to the invention, comprising a dental implant and the intermediate attachment part of FIG. 19.

On its side, the first groove 17 in the dental implant 6 forms a shoulder 36 comprising a bearing face 37 perpendicular to the first longitudinal axis I-I and oriented toward the proximal end 6a of the dental implant 6 (FIG. 20). The bearing face 37 is in the form of a circular ring.

The contact surface 35 and the bearing face 37 make the snap-fitting of the intermediate attachment part 1 in the dental implant 6 irreversible. When the longitudinal fins 9a to 9c are snap-fitted into the first groove 17 (see FIG. 20), the substantially ring-shaped contact surface 35 and the bearing face 37 effectively oppose extraction of the intermediate attachment part 1 from the dental implant 6.

It may be noted from FIGS. 9, 11, 13, 15, 17 and 18 that when the intermediate attachment part 1 is snap-fitted into the dental implant 6, the intermediate axial segment 10 protrudes beyond the dental implant 6 (the slots F4 to F6 are effectively prolonged beyond the distal prolongation 25). Thus, should it prove necessary to extract the internally threaded insert 19, the intermediate attachment part 1 can be sectioned on a plane P perpendicular to the first longitudinal axis I-I and intersecting the intermediate axial segment 10. The fins 9a to 9c are therefore detached and can be removed from the dental implant 6.

The fact that the intermediate axial segment 10 protrudes beyond the dental implant 6 is also present in the first embodiment (see FIG. 3), thereby guaranteeing the possibility of extracting the intermediate attachment part 1 should 3o the practitioner not succeed in unclipping the second end 1b from the first groove 17.

Figure 21:
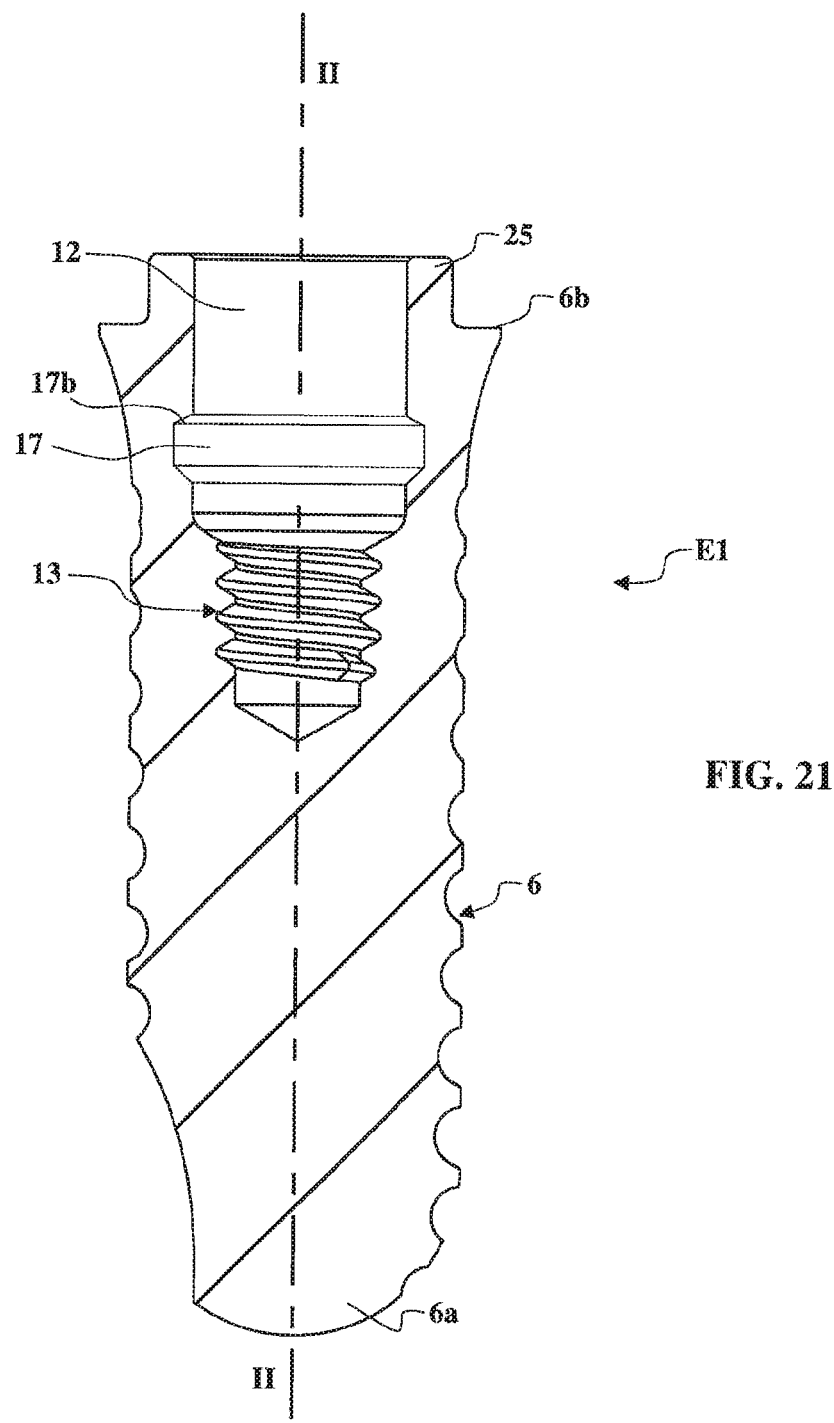
FIG. 21 is a view in longitudinal section of an alternative form of dental implant intended to be combined with the intermediate attachment parts of FIG. 1 or 19 to form an alternative form of the first assembly according to the invention.

FIG. 21 illustrates an alternative form of dental implant 6 intended to be combined with the intermediate attachment parts 1 of FIGS. 1 and 2 to form an alternative form of the first assembly E1 according to the invention. In this dental implant 6, no use is made of an internally threaded insert 19, the threaded proximal segment 13 being formed directly in the lateral wall of the internal connection housing 12. It may be seen that the first groove 17 comprises a distal segment 17b that is frustoconical so as to allow reversible snap-fitting of the intermediate attachment part 1. Nevertheless, use may alternatively be made of a shoulder 36 as in FIG. 20, to ensure irreversible snap-fitting.

Figure 22:
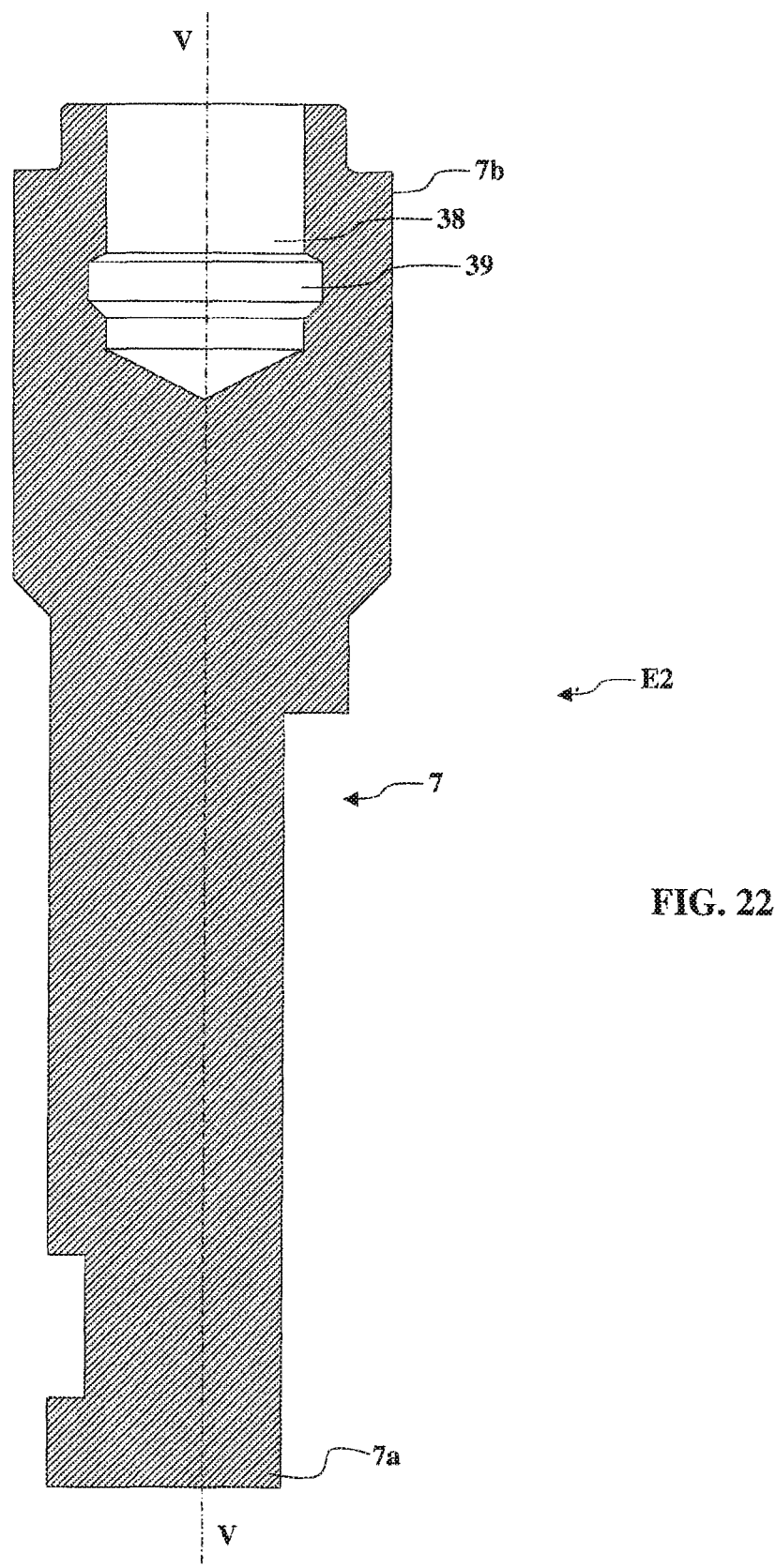
FIG. 22 is a view in longitudinal section of a dental implant analogue intended to be combined with the intermediate attachment parts of FIG. 1 or 19 to form a second assembly according to the invention.

FIG. 22 illustrates a dental implant analogue 37 intended to accept an intermediate attachment part 1 to form a second assembly E2 according to the invention.

The dental implant analogue 7 extends along a fifth longitudinal axis V-V between a proximal end 7a and a distal end 7b, and comprises an internal connection housing 38 extending from the distal end 7b and toward the proximal 10o end 7a. The internal connection housing 38 comprises a fourth groove 39 intended to accept by snap-fitting the free distal portions 90a to 90c of the longitudinal fins 9a to 9c of the second set of fins 9.

The intermediate attachment part 1 allows a dental prosthetic component 4 to be fixed reversibly by snap-fitting while it is being produced by successive placements on the dental implant analogue 7 contained in a master model.

Admittedly, the reversible attachment by snap-fitting is precarious, but it is enough for the work of the prosthetist, and avoids the need to resort to a fixing screw 3 which is always time consuming to screw in or unscrew.

The present invention is not restricted to the embodiments which have been explicitly described, but includes various alternative forms of generalizations thereof that fall within the scope of the claims hereafter.

The invention claimed is:

1. An assembly comprising a substantially tubular intermediate attachment part with a first through-passage for attaching a screw-through dental prosthesis component or a dental tool to a dental implant, said intermediate attachment part extending along a first longitudinal axis (I-I) between a first end and a second end, and in which:
    the first end comprises a first set of longitudinal fins, each longitudinal fin comprising a free distal portion that can move radially in an elastic manner in order to engage by snap-fitting in the dental prosthetic component or in the dental tool,
    the second end comprises a second set of longitudinal fins, each longitudinal fin comprising a free distal portion that can move radially in an elastic manner in order to engage by snap-fitting in the dental implant,
    wherein:
    the first and second sets of longitudinal fins are defined by a plurality of longitudinal slots extending over just a portion of the length of the intermediate attachment part and originating alternately from the first end and from the second end, said slots extending along the one same intermediate axial segment of the intermediate attachment part such that the longitudinal fins of the first and second sets exhibit an overlap along their length,
    the assembly comprises a dental implant extending along a second longitudinal axis (II-II) between a proximal end and a distal end, with an interior connection housing extending from the distal end and toward the proximal end and comprising an internally threaded proximal segment,
    the assembly comprises an attachment screw comprising a screw head from which there extends a screw shank equipped with a threaded segment intended to be received by screw-fitting in the internally threaded proximal segment of the dental implant,
    the internal connection housing comprises a first groove, formed between the internally threaded proximal segment and the distal end of the dental implant, and intended to accept by snap-fitting the free distal portions of the fins of the second set of longitudinal fins.

2. The assembly as claimed in claim 1, wherein the snap-fitting of the free distal portions of the fins of the second set of longitudinal fins is irreversible.

3. The assembly as claimed in claim 1, wherein the snap-fitting of the free distal portions of the fins of the second set of longitudinal fins is reversible.

4. The assembly as claimed in claim 1, wherein the internally threaded proximal segment of the dental implant consists of an internally threaded insert which is attached into and indexed in terms of rotation in the interior connection housing.

5. The assembly as claimed in claim 4, wherein the second end of the intermediate attachment part and the internally threaded insert are shaped in such a way that, when the internally threaded insert is axially in abutment against the second end of the intermediate attachment part, this abutment opposes withdrawal of the second end of the intermediate attachment part from the first groove.

6. The assembly as claimed in claim 4, wherein a relative translational movement of the internally threaded insert toward the distal end of the dental implant along the second longitudinal axis (II-II) causes radial expansion of the second end of the intermediate attachment part.

7. The assembly as claimed in claim 1, wherein:
it comprises a dental prosthetic component comprising a second through-passage made up of successive first and second passage segments, said first passage segment extending from a proximal end of the dental prosthetic component along a third longitudinal axis (III-III), and said second passage segment prolonging the first passage segment,
the first passage segment comprises a second groove intended to receive by snap-fitting the free distal parts of the fins of the first set of longitudinal fins.

8. The assembly as claimed in claim 7, wherein the first end of the intermediate attachment part and the head of the attachment screw are shaped in such a way that, when the head of the attachment screw is axially in abutment against the first end of the intermediate attachment part, this abutment opposes withdrawal of the first end of the intermediate attachment part from the second groove.

9. The assembly as claimed in claim 7, wherein a relative translational movement of the head of the attachment screw toward the proximal end of the dental implant along the second longitudinal axis (II-II) causes radial expansion of the first end of the intermediate attachment part.

10. The assembly as claimed in claim 9, wherein the second groove and/or the first end of the intermediate attachment part have respective contact surfaces which are shaped in such a way that radial expansion of the first end of the intermediate attachment part causes the proximal end of the dental prosthetic component to press axially, along the second longitudinal axis (II-II), toward the distal end of the dental implant.

11. The assembly as claimed in claim 7, wherein:
the first passage segment of the dental prosthetic component has transverse dimensions that allow it to accept the first end of the intermediate attachment part and the screw head by axial penetration along the third longitudinal axis (III-III) from the proximal end of the dental prosthetic component,
the second passage segment of the dental prosthetic component has transverse dimensions smaller than those of the first passage segment, but large enough for the passage of a tool used to turn the attachment screw along the third longitudinal axis (III-III).

12. The assembly as claimed in claim 7, wherein the first and second passage segments form a nonzero angle (A) between them.

13. The assembly as claimed in claim 7, wherein the dental prosthetic component comprises a proximal end configured to come directly into abutment against the distal end of the dental implant.

14. The assembly as claimed in claim 7, comprising means for indexing the rotation of the dental prosthetic component and of the dental implant about the second longitudinal axis (II-II).

15. The assembly as claimed in claim 7, wherein the dental prosthetic component is a dental prosthesis abutment having an exterior shape substantially in the shape of a tooth, made of metal or made of ceramic.

16. The assembly as claimed in claim 7, wherein the dental prosthetic component is a block of ceramic of substantially cylindrical or prismatic exterior shape and intended to be machined in order to obtain a substantially tooth-shaped exterior shape.

17. The assembly as claimed in claim 7, wherein the dental prosthetic component is a dental post.

18. The assembly as claimed in claim 7, further comprising a dental tool of the impression-transfer, implant-bearing, intra-oral scanning body, healing cap or closure cap type, said dental tool extending along a fourth longitudinal axis (IV-IV) and comprising an interior bore equipped with a third groove intended to accept, by snap-fitting, the free distal parts of the fins of the first set of longitudinal fins.

19. The assembly as claimed in claim 18, comprising means for indexing the rotation of the dental tool or of the dental implant analogue about the fourth (IV-IV) or the fifth (V-V) longitudinal axis.

* * * * *